(12) United States Patent
Murali et al.

(10) Patent No.: US 6,636,671 B2
(45) Date of Patent: Oct. 21, 2003

(54) MARKINGS FOR ALIGNING FIBER OPTIC BUNDLE

(75) Inventors: Venkatesan Murali, San Jose, CA (US); Rama K. Shukla, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 09/741,642

(22) Filed: Dec. 19, 2000

(65) Prior Publication Data

US 2002/0076163 A1 Jun. 20, 2002

(51) Int. Cl.$^7$ ................................................ G02B 6/30
(52) U.S. Cl. ........................................................ 385/49
(58) Field of Search ............................ 385/49, 52, 50, 385/147, 129–132; 430/321, 326; 372/96, 20, 34, 50, 94

(56) References Cited

U.S. PATENT DOCUMENTS

| | | | | |
|---|---|---|---|---|
| 5,359,687 A | * | 10/1994 | McFarland et al. ............ 385/49 |
| 5,375,184 A | * | 12/1994 | Sullivan ....................... 385/129 |
| 6,373,872 B2 | * | 4/2002 | Deacon ........................ 372/102 |
| 6,438,279 B1 | * | 8/2002 | Craighead et al. ............ 385/12 |

* cited by examiner

Primary Examiner—Akm Enayet Ullah
(74) Attorney, Agent, or Firm—Charles K. Young

(57) ABSTRACT

A lithographic process is used to place a marking on a waveguide to indicate optical channels within the waveguide. A photonic component is positioned against the waveguide based on the markings and adjusted until aligned.

19 Claims, 3 Drawing Sheets

MARKINGS FOR ALIGNING FIBER OPTIC BUNDLE

BACKGROUND OF THE INVENTION

1. Field of the Invention

The described invention relates to the field of optics. In particular, the invention relates to alignment and coupling of photonic components.

2. Description of Related Art

Photonic components propagate light and include waveguides, optical fibers, amplifiers, couplers, splitters, and other devices for carrying light-based signals. A fiber optic bundle has multiple optical fibers for propagating light, and an array waveguide (AWG) has multiple channels for propagating light within. Coupling a fiber optic bundle to an AWG, for example, is not easy. Manual alignment requires detecting and maximizing light connectivity between the fiber optic bundle and the AWG. Once a good connection is obtained, permanently fixing the alignment is required.

FIG. 1A shows a prior art fiber optic bundle 10. The fiber optic bundle 10 comprises multiple optical fibers 12 sandwiched between two retainers 16 and 18. The retainers are substrates made of silicon, for example, that are appropriately masked with a suitable etch mask. Thereafter, symmetrically spaced unmasked areas of the substrate are exposed to a chosen anisotropic etchant, such as hot KOH or ethylenediamine. This etchant preferentially attacks a chosen (100) crystallographic plane of the silicon substrate and preferentially etches in a vertical direction until V-shaped grooves ("V-grooves") are attained. Upon completion of these V-shaped grooves, optical fibers are placed in the grooves and come to rest in alignment with the center of the V-grooves between the retainers 16 and 18.

FIG. 1B shows a prior art single retainer without the optical fibers. The two retainers 16 and 18 form a termination block for the fiber optic bundle by sandwiching the optical fibers together within their V-grooves 24. The termination block maintains the spacing between the optical fibers and allows for easily handling the fiber optic bundle. The ends of the optical fibers 22 are typically polished after being set in the termination block.

FIG. 2 shows a prior art example of an AWG. The AWG comprises multiple channels 30 running through the AWG. The AWG may comprise a glass, silicon, oxide or polymer substrate. The channels are made of materials having a higher index of refraction than the rest of the AWG. AWGs and fiber optic bundles may be made with various numbers of channels.

FIG. 3 shows a side view of a fiber optic bundle being aligned to an AWG 42. The optical fibers of the fiber optic bundle and the channels of the AWG 42 have identical spacings and number. A dotted line 45 shows the channels in the AWG. An epoxy 50 is used to hold the termination block 40 of the fiber optic bundle to the AWG 42, but alignment must first be achieved and then maintained. It is difficult to achieve alignment, i.e., photonically couple the optical fibers to the AWG channels, and then to epoxy without losing alignment.

DETAILED DESCRIPTION

One of the issues with aligning a photonic component with an array waveguide is that the channels of the array waveguide are not visible. Although the channels have a higher index of refraction than the surrounding substrate, they are not readily distinguishable by the human eye.

Figure 1A:
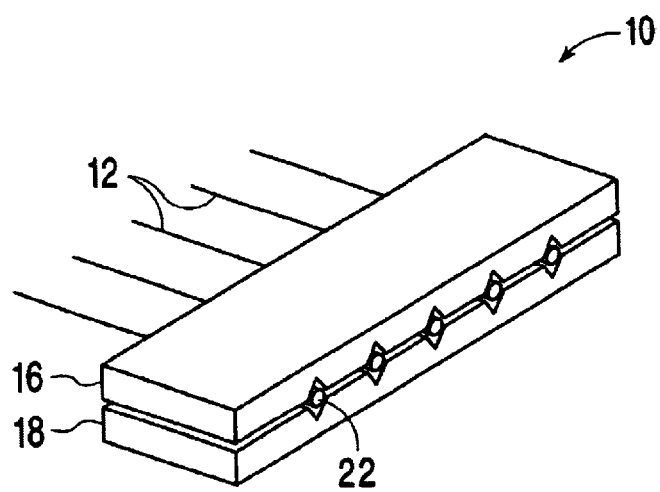
FIG. 1A shows a prior art fiber optic bundle
Figure 1B:
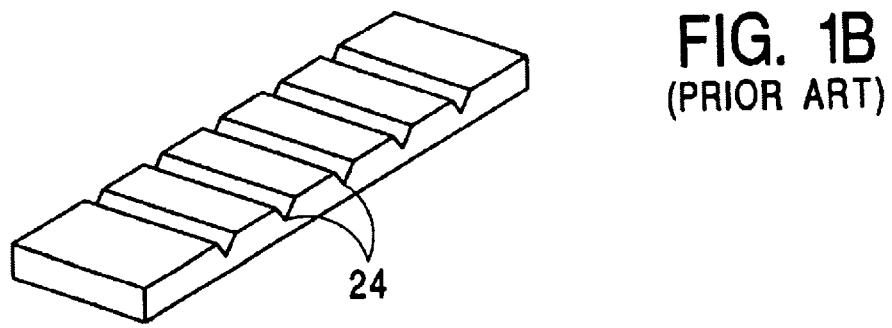
FIG. 1B shows a prior art single retainer without the optical fibers.
Figure 2:
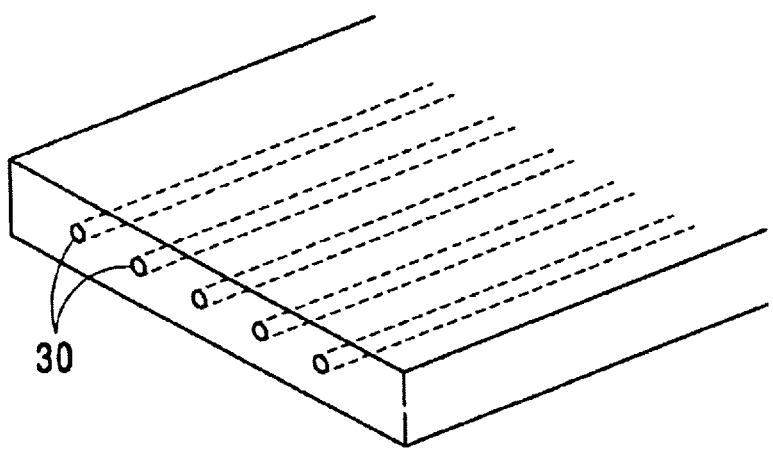
FIG. 2 shows a prior art example of an AWG.
Figure 3:
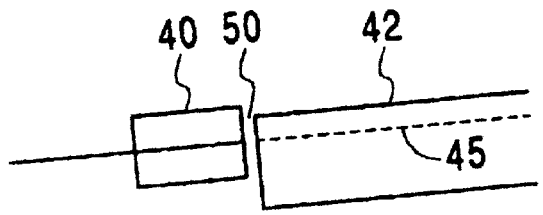
FIG. 3 shows a side view of a fiber optic bundle being aligned to an AWG.
Figure 4:
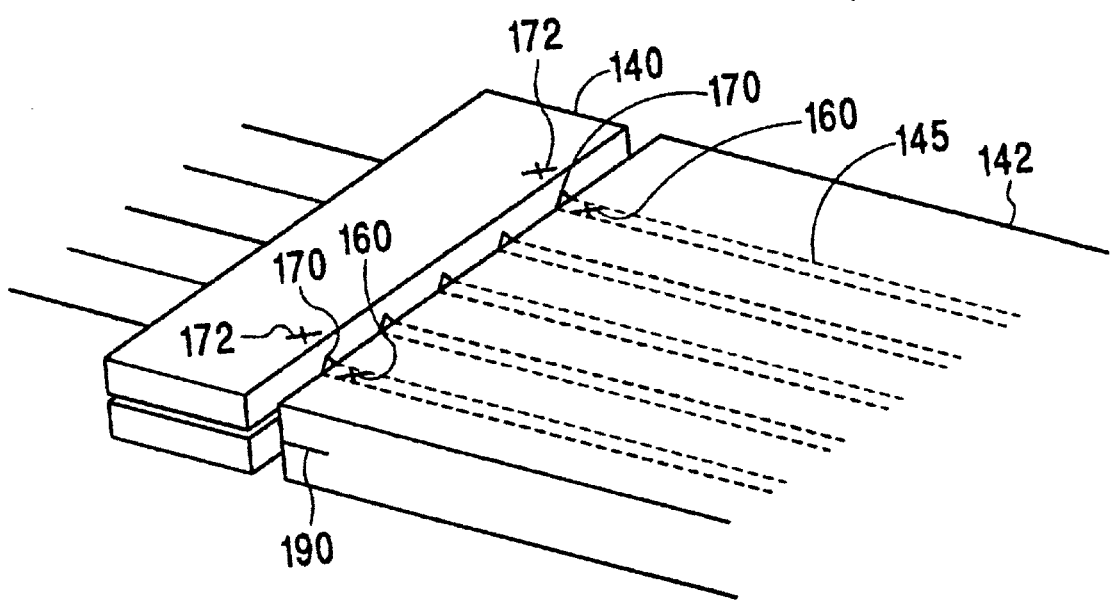
FIG. 4 shows a first embodiment for aligning a fiber optic bundle to an AWG.

FIG. 4 shows one embodiment for aligning a fiber optic bundle 140 to an array waveguide (AWG) 142. Markings 160 are placed on a surface of the waveguide 142 indicative of the channels 145 within the waveguide 142. The markings 160 are lithographically-defined, i.e., they are placed on the waveguide during the lithographic processing of the waveguide, and they precisely indicate the location of the channels 145. In one embodiment, an 'X' marking may indicate the center of a channel directly beneath it. In another embodiment, markings may indicate the outside boundaries of an interior channel. In one embodiment, markings are placed over the outermost channels of the waveguide 142, however, the markings can be placed over any of the channels 145.

The markings may be achieved by etching into the substrate of the waveguide, by placing ink on a, e.g., passivation layer, or by any other technique that produces a marking that is visible to the human eye.

The fiber optic bundle may have alignment markings 172 of its own. Thus, viewed from the top it would be easy to line up the markings 160 of the waveguide to the alignment markings 172 of the fiber optic bundle 140. Alternatively, the tops of V-grooves 170 may be used to align the fiber optic bundle 140 to the markings 160 of the waveguide 142.

In another embodiment, marking 190 on the side surface of the waveguide 142 may be used to indicate a depth of the channels 145 within the waveguide 142. As an example, a marking 190 on the side of the waveguide may be achieved by deposition of a layer of material having a different color than the rest of the substrate. This layer may be limited to the side surfaces of the waveguide 142.

Figure 5:
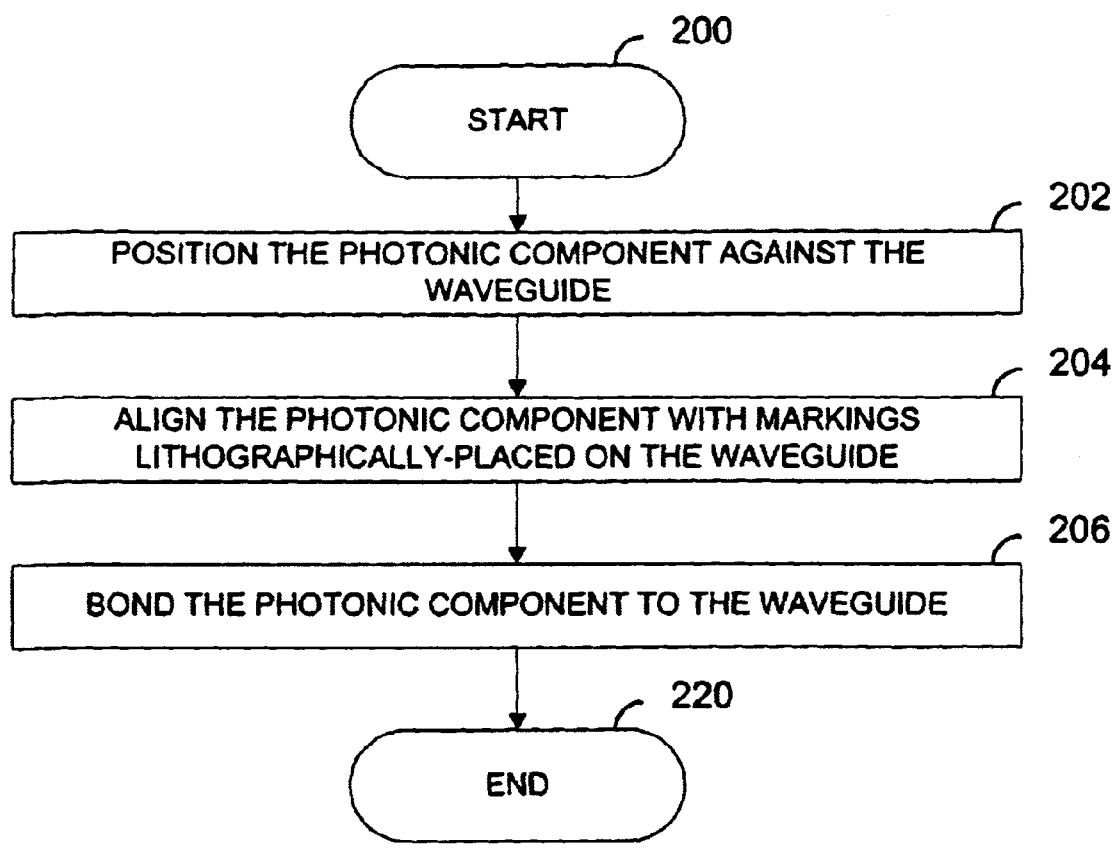
FIG. 5 shows a flowchart for aligning a photonic component to a waveguide.

FIG. 5 shows a flowchart for aligning a photonic component to a waveguide. The flowchart starts at block 200 and continues at block 202, at which the photonic component, such as a fiber optic bundle, is placed against the waveguide. At block 204, the photonic component is aligned to the lithographically-defined markings on the waveguide. In one embodiment, the markings on the photonic component are used to help with course alignment with the markings on the waveguide. Some type of optical measuring device may be needed to help with fine alignment by optimizing the optical coupling between the photonic component and the waveguide. At block 206, the photonic component is bonded to the waveguide. In one embodiment, an epoxy having an index of refraction that is substantially similar to the channels of the waveguide and to the optical fibers of the fiber optic bundle is used to help maintain the optical coupling between the waveguide and the photonic component.

Thus, a method and apparatus for aligning a photonic component with a waveguide is disclosed. However, the specific embodiments and methods described herein are merely illustrative. Numerous modifications in form and detail may be made without departing from the scope of the invention as claimed below. For example, although a fiber optic bundle aligned to a waveguide was described, the same process can be used for aligning other photonic components, such as aligning two waveguides to each other. The invention is limited only by the scope of the appended claims.

What is claimed is:

1. A method of coupling a photonic component with a waveguide comprising:

positioning a substantially planar end of the photonic component against a substantially planar end of the waveguide; and aligning the photonic component with markings that have been lithographically-placed on a surface of the waveguide.

2. The method of claim 1, wherein the photonic component is a fiber optic bundle.

3. The method of claim 2 further comprising:

aligning outermost optical fibers of the fiber optic bundle with the markings on the surface of the waveguide.

4. The method of claim 3 further comprising:

bonding the fiber optic bundle to the waveguide.

5. The method of claim 1, wherein the photonic component is a second waveguide.

6. The method of claim 1, wherein the waveguide has multiple channels, and each channel provides a separate optical pathway through the waveguide.

7. The method of claim 6, wherein the markings provide a visible indication of a location of the multiple channels located within the waveguide.

8. A method of aligning a fiber optic bundle with a waveguide comprising:

using a lithographic process to place a marking on a surface of the waveguide, the marking providing a visible indication of an optical channel within the waveguide;

positioning the fiber optic bundle against the waveguide based on the marking; and adjusting the fiber optic bundle until alignment is achieved.

9. The method of claim 8 further comprising:

using the lithographic process to place a second marking on the surface of the waveguide, the second marking indicative of a second optical channel within the waveguide, wherein the positioning of the fiber optic bundle against the waveguide is also based on the second marking.

10. The method of claim 9, wherein the lithographic process uses an etch to place the first and second markings.

11. The method of claim 9, wherein the lithographic process uses an ink to place the first and second markings.

12. The method of claim 9, wherein the lithographic process deposits a layer of material that is distinguishable by the human eye to place the first and second markings.

13. The method of claim 9, wherein the marking is directly above the optical channel.

14. The method of claim 9, wherein the marking is lateral to the optical channel.

15. The method of claim 9, wherein the positioning of the fiber optic bundle against the waveguide is also based on alignment markings on the fiber optic bundle.

16. The method of claim 15 further comprising:

applying an epoxy between the fiber optic bundle and the waveguide.

17. A method of coupling a first photonic component with a second photonic component, both the first and second photonic components have a plurality of channels within them, at least the first photonic component having markings on a surface, the markings providing a visible indication of a location of the plurality of channels within the first photonic component, wherein the location of the plurality of optical channels within the first photonic component is not otherwise visibly detectable, the method comprising:

positioning a substantially planar end of the first photonic component against a substantially planar end of the second photonic component; and aligning the first photonic component with the second photonic component using the markings of the first photonic component.

18. The method of claim 17, wherein the second photonic component has second markings on a surface, the second markings providing a visible indication of a location of the plurality of channels within the second photonic component, wherein the location of the plurality of channels within the second photonic component is not otherwise visibly detectable, and the aligning the first photonic component with the second photonic component using the markings of the first photonic component further comprise:

aligning the markings of the first photonic component with the second markings of the second photonic component.

19. The method of claim 18, wherein the markings of the first photonic component and the second markings of the second photonic component are lithographically-defined.

* * * * *